United States Patent

Iguchi

[11] Patent Number: 5,993,232
[45] Date of Patent: Nov. 30, 1999

[54] IC CARD CONNECTOR UNIT

[75] Inventor: Shinichi Iguchi, Tokyo, Japan

[73] Assignee: Oki Electric Industry Co., Ltd., Tokyo, Japan

[21] Appl. No.: 09/043,190
[22] PCT Filed: Jul. 10, 1997
[86] PCT No.: PCT/JP97/02392

§ 371 Date: Mar. 16, 1998

§ 102(e) Date: Mar. 16, 1998

[87] PCT Pub. No.: WO98/04999

PCT Pub. Date: Feb. 5, 1998

[30] Foreign Application Priority Data

Jul. 25, 1996 [JP] Japan ................... 8-196396

[51] Int. Cl.[6] .................................... H01R 13/15
[52] U.S. Cl. ................ 439/260; 439/260; 439/261; 439/262; 439/267
[58] Field of Search .................. 439/260, 261, 439/262, 267

[56] References Cited

U.S. PATENT DOCUMENTS

| 4,236,667 | 12/1980 | Crowley et al. ............ 235/443 |
| 4,795,897 | 1/1989 | Chalendard ............... 235/482 |
| 4,932,889 | 6/1990 | Bleier et al. ............. 439/260 |
| 4,940,418 | 7/1990 | Shimizu et al. ........... 439/260 |
| 5,000,694 | 3/1991 | Komatsu ................. 439/260 |
| 5,813,877 | 9/1998 | Nakamura ............... 439/267 |

FOREIGN PATENT DOCUMENTS

| 62-23360 | 2/1987 | Japan . |
| 63-148386 | 6/1988 | Japan . |
| 2-23494 | 1/1990 | Japan . |
| 3-100969 | 10/1991 | Japan . |
| 8-7052 | 12/1996 | Japan . |

Primary Examiner—Paula Bradley
Assistant Examiner—Truc Nguyen
Attorney, Agent, or Firm—Rabin & Champagne, PC

[57] ABSTRACT

An IC card connection unit according to the invention is for use in electronic equipment into which an IC card is inserted. It included a body provided with a contacting arrangement for contacts, and a card supporter fixedly attached to the body, provided with a recess for forming a card insertion path. A card butting part movable when pressed by the tip of the IC card is disposed in the card insertion path, and a pressing force applied to the card butting part is converted into a force acting in the direction crossing the direction of the card insertion path, whereby contacts of the equipment are shifted so as to be in contact with contacts of the IC card while the IC card is retained in the card insertion path.

6 Claims, 3 Drawing Sheets

IC CARD CONNECTOR UNIT

TECHNICAL FIELD

The invention relates to an IC (integrated circuit) card connection unit used in electronic equipment into which an IC card with an integrated circuit mounted therein is inserted, and to a method for connecting contacts of the IC card with contacts of the equipment.

BACKGROUND TECHNOLOGY

In a conventional connection unit for an IC card (memory card included) used in electronic equipment, for example, portable electronic equipment used for electronic commercial transactions, contacts of the equipment are disposed so as to protrude in an insertion path for the IC card and come into contact with contacts of the IC card inserted into the insertion path.

The conventional IC card connection unit, wherein the contacts of the equipment are disposed so as to protrude in the insertion path for the IC card, has a drawback in that when the IC card is inserted into the insertion path, the contacts of the equipment come into contact with resin material composing the IC card before they come into contact with the contacts of the IC card. This shaves off the resin material, with the result that generated shavings of the resin material adhere to the contacts, causing faulty contact and leading to poor reliability.

Furthermore, there has been a likelihood that a high voltage developed when the contacts of the IC card are disengaged from the contacts of the equipment may destroy the circuit of the IC card.

It is therefore an object of the invention to provide an IC card connection unit wherein generation of shavings of resin composing the IC card does not occur when bringing the contacts of the IC card into contact with the contacts of the equipment, enhancing reliability of contact between the contacts, and preventing a high voltage from being developed when the contacts are disengaged from each other, eliminating a risk of the IC card circuit being destroyed.

SUMMARY OF THE INVENTION

An IC card connection unit according to the invention comprises a body provided with a card butting part movable when pressed by the tip of an IC card, and contacting means for contacts wherein a pressing force applied to the card butting part is converted into a force acting in the direction crossing the direction of the IC card insertion, causing contacts of equipment to be shifted and come in contact with contacts of the IC card, and a card supporter for retaining the IC card pressed down by the contacts of the equipment, the contacts of the equipment being able to be in or out of contact with the contacts of the IC card without touching resin composing the IC card so that shavings of the resin are not generated, improving reliability of contact between the contacts.

Furthermore, in the IC card connection unit according to the invention, a switch for applying a voltage to the circuit of the IC card is installed on the body such that the switch is turned on, applying the voltage after the contacts of the equipment come in contact with the contacts of the IC card, and the same is turned off, terminating application of the voltage before the contacts of the equipment are separated from the contacts of the IC card. Consequently, a high voltage is not developed upon separation of the contacts from each other, eliminating a risk of the circuit of the IC card being destroyed.

BRIEF DESCRIPTION OF THE DRAWINGS

FIG. 6 is a chart showing the relationship between a contact gap and a travel distance of a guide arm;

FIG. 7 a sectional view of the main part of an IC card connection unit according to a second embodiment of the invention, cut in the middle thereof along the direction of an IC card insertion; and FIG. 8 a sectional view of the embodiment shown in FIG. 7; and when the IC card is inserted.

BEST MODE FOR CARRYING OUT THE INVENTION

Figure 1:
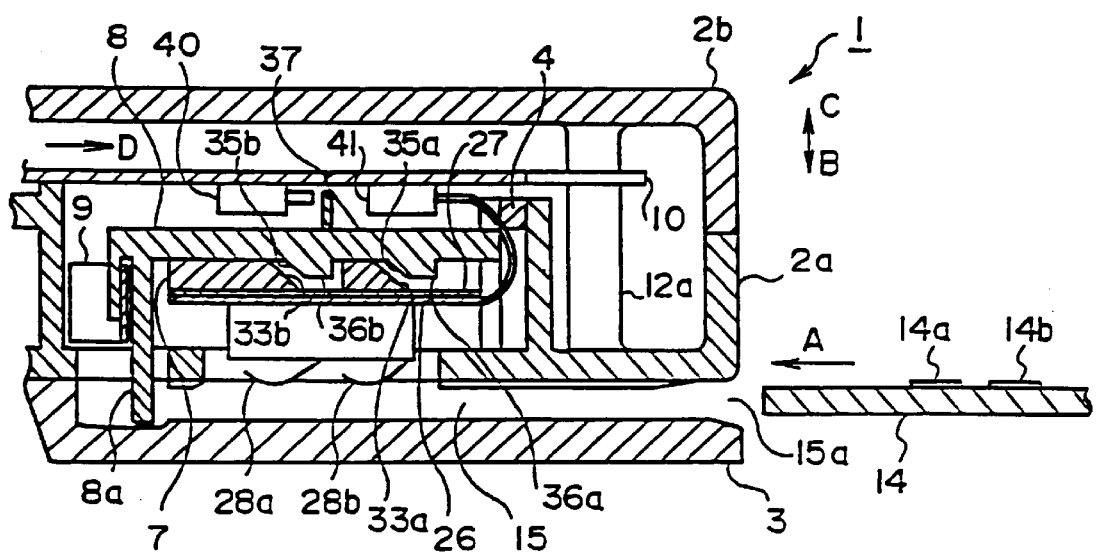
FIG. 1 is a sectional view of the main part of an IC card connection unit according to a first embodiment of the invention, cut in the middle thereof along the direction of an IC card insertion path.

The invention is described in detail hereinafter with reference to the accompanying drawings. Elements common to the drawings are denoted by the same reference numerals.

First Embodiment

Figure 3:
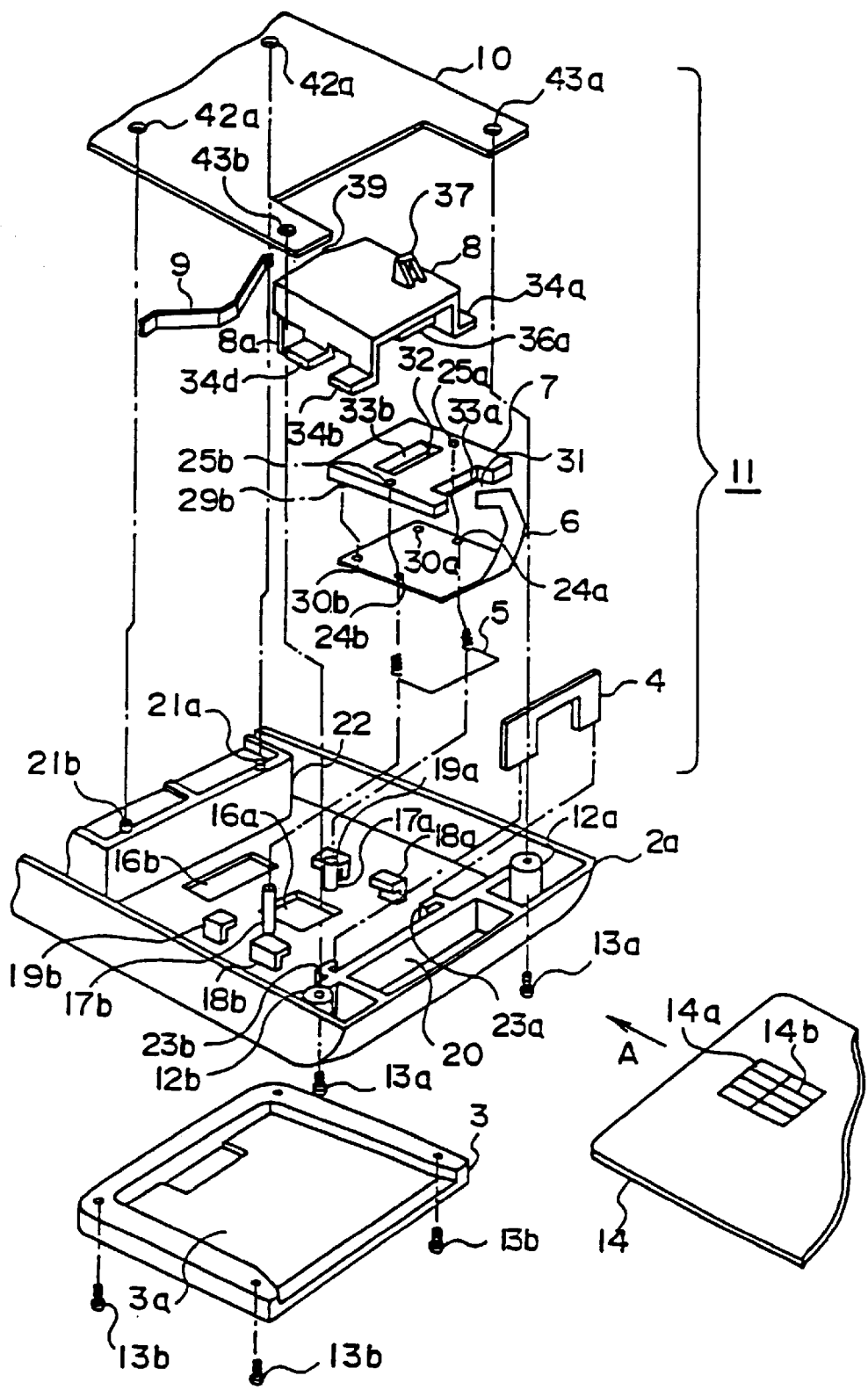
FIG. 3 a partially exploded perspective view of the main part of the embodiment shown in FIG. 1.

FIG. 1 is a sectional view of the main part of an IC card connection unit according to a first embodiment of the invention, cut in the middle thereof along the direction of an IC card insertion path. FIG. 3 is a partially exploded perspective view of the main part of the IC card connection unit according to the first embodiment of the invention. As shown in FIG. 1, the IC card connection unit comprises a body (housing) 1 and a card supporter 3.

The body 1 comprises a lower base 2a in the shape of a box, and an upper cover 2b. As shown in FIG. 3, means 11 for bringing contacts in contact with each other, comprising an arm stopper 4, a coil spring 5, a printed circuit board 6 for contacts, a guide plate 7, a guide arm 8, a return spring 9, and a printed circuit board 10 for switching, is incorporated in the lower base 2a, and covered with the upper cover 2b. As shown in FIG. 1, the upper cover 2b is fastened to the lower base 2a with screws 13a inserted into bosses 12a, 12b, having spot facing holes, respectively.

The card supporter 3 having a recess 3a is fastened to the lower base 2a with screws 13b, and provided with a card insertion inlet 16a at one end thereof for inserting an IC card 14, forming a card insertion path 15 in which an arm 8a serving as a card butting part is incorporated.

As shown in FIG. 3, a contact hole 16a and a guide arm hole 16b, leading to the card insertion path 15, are provided on the bottom of the lower base 2a. Guide posts 17a, 17b, disposed on opposite sides of the contact hole 16a and at positions extending in the direction crossing the card insertion path 15, for example, at right angles thereto, are integrally formed with L-shaped catches 18a, 18b, and other L-shaped catches 19a, 19b, disposed opposite to the former, respectively. The lower base 2a is provided with a rib 20 for reinforcement of sidewalls, and a wall 22 having knobs 21a, 21b for positioning. The rib 20 is integrally formed with L-shaped catches 23a, 23b for positioning the arm stopper 4 in the shape of a plate to be inserted therein from above.

As shown in FIG. 1, the printed circuit board 6 for the contacts is composed of a flexible printed cable 26 and a reinforcing plate 27 which, as shown in FIG. 3, is provided with holes 24a, 24b for slidably fitting onto the guide posts 17a, 17b, respectively. The printed cable 26 is provided with flexible contacts 28a, 28b of an electronic equipment, in a running fit with the contact hole 16a.

As shown in FIG. 3, the guide plate 7 has holes 25a, 25b for slidably fitting onto the guide posts 17a, 17b, and provided with positioning knobs 29a, 29b (29a not shown) on the underside thereof for insertion into positioning holes 30a, 30b, provided on the printed circuit board 6 for the contacts. The guide plate 7 has a notch 31 and a through-hole 32, on the edge of which, inclined surfaces 33a, 33b are provided, respectively, as an element of respective upward sliding kinetic pairs seen from the direction of the card insertion.

The coil spring 5, the printed circuit board 6 for the contacts, and the guide plate 7 are in this order fitted onto the guide posts 17a, 17b. Accordingly, the printed circuit board 6 for the contacts and the guide plate 7 are subjected to the resilience of the coil spring 5, acting (i.e., being urged) in the direction of the arrow C as shown in FIG. 1.

The guide arm 8 in a form resembling the letter U, having outwardly extended feet 34a to 34d (34c not shown), is fitted to the L-shaped catches 18a, 18b, and 19a, 19b so as to be freely slidable in the direction of the card insertion, denoted by the arrow A. On the back face of the guide arm 8, there are provided protuberances 36a, 36b, having inclined surfaces 35a, 35b, respectively, as elements in a sliding kinetic pair relationship with the inclined surfaces 33a, 33b of the guide plate 7, and on the surface thereof, a switch press-down part 37 having a switch press-down face.

Alternatively, a sliding kinetic pair relationship between the guide plate 7 and the guide arm 8 may be set up by providing the guide plate 7 with protuberances having inclined surfaces, and by providing the guide arm 8 with recesses having inclined surfaces.

An arm 8a, and a return spring stopper 39 are provided at the rear end of the guide arm 8. The arm 8a protrudes; through the guide arm hole 16b into the card insertion path 15. The return spring 9 composed of a flat spring in an arc form, is fitted to the return spring stopper 39 at the center thereof and butts against the wall 22 at opposite ends thereof, and is urged in the direction of the arrow D in FIG. 1.

As shown in FIG. 1, the printed circuit board 10 for switching is provided with a switch 40 for applying a voltage to the circuit of the IC card 14, and a connector 41 connected to the printed cable 26. When fastening the upper cover 2b to the lower base 2a with screws, fixture holes 43a, 43b of the printed circuit board 10 for switching are fitted to the bosses of the lower base 2a after fitting positioning holes 42a, 42b thereof onto the positioning knobs 21a, 21b.

Figure 2:
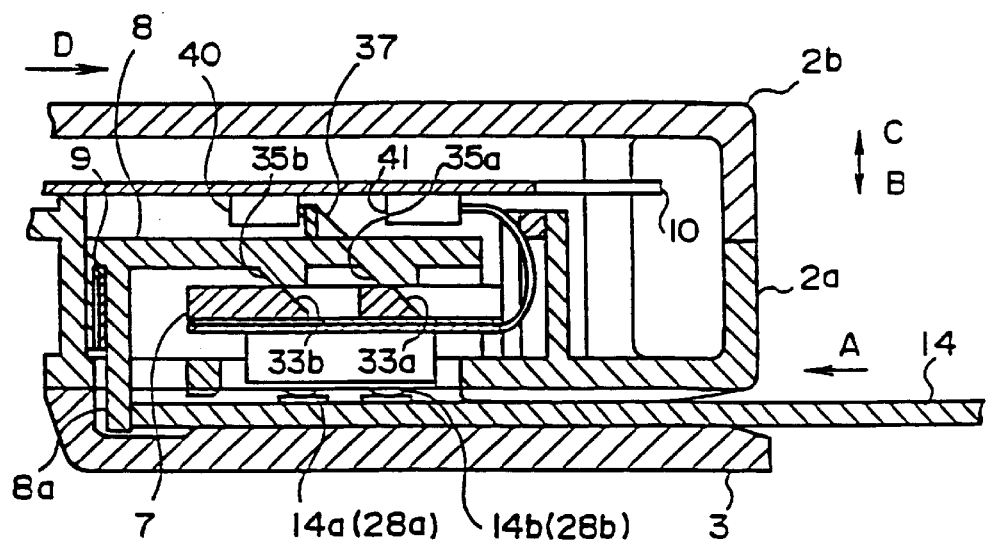
FIG. 2 a sectional view of the embodiment shown in FIG. 1 when the IC card is inserted.
Figure 4:
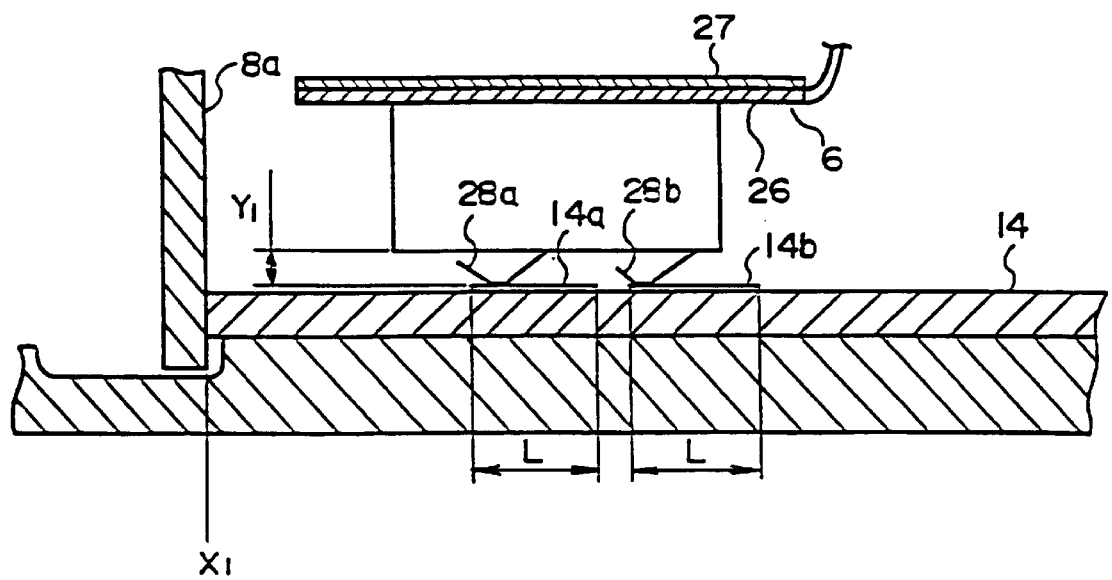
FIG. 4 a sectional view showing contacts in an initial connection condition.
Figure 5:
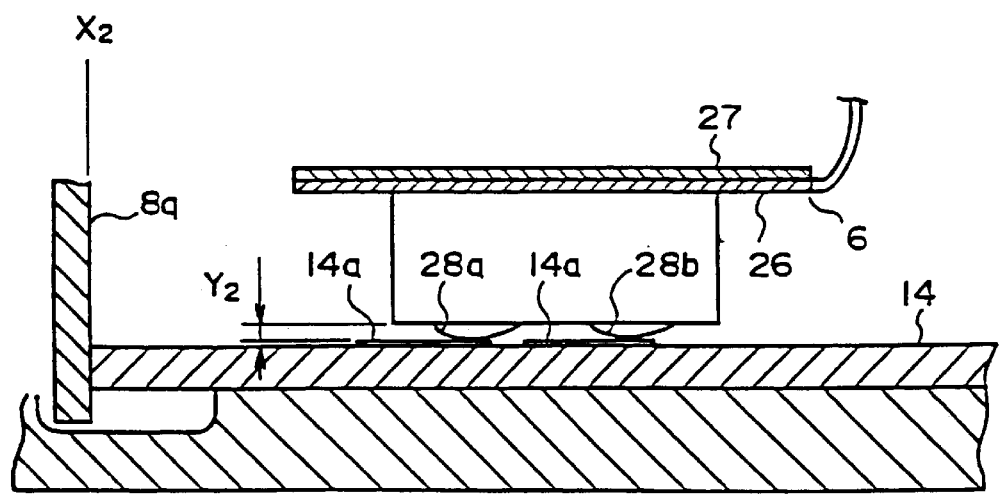
FIG. 5 a sectional view showing contacts in a complete connection condition.

FIG. 2 is a sectional view of the main part of the IC card connection unit according to the first embodiment of the invention, cut in the middle thereof along the direction of the IC card insertion, when the IC card is inserted. FIG. 4 is a sectional view showing contacts in an initial connection condition. FIG. 5 is a sectional view showing the contacts in a complete connection condition. FIG. 6 is a chart showing the relationship between a contact gap and a travel distance of the guide arm.

Now the operation is explained hereinafter. When the IC card 14 is, to be inserted into the card insertion path 15, the tip of the IC card butts against the arm 8a of the guide arm 8, whereupon the tip of the guide arm 8 is butted against the arm stopper 4 by the urging of the return spring 9, and the travel distance of the guide arm 8 is 0 as shown in FIG. 6.

When the IC card 14 is further inserted in the direction of the arrow A, the guide arm 8 is pushed by the tip of the card and slid in parallel with the card insertion path 15 in the direction of the arrow A, causing the protuberances 36a, 36b of the guide arm 8 to butt against the inclined surfaces 33a, 33b of the guide plate 7, respectively. This results in the guide plate 7 moving along the guide posts 17a, 17b in the direction of the arrow B crossing the direction of the arrow A at right angles by a component of a pressing force acting in the direction of the arrow A.

Upon movement of the guide plate 7 in the direction of the arrow B against the urging of the coil springs 5, the printed circuit board 6 for the contacts also moves in the direction of the arrow B, causing the contacts 28a, 28b of the equipment to move towards the card insertion path 15, whereupon an initial connection stage is reached, wherein a travel distance of the guide arm is at X1, and a contact gap at Y1 as shown FIGS. 4 and 6. When the IC card 14 is further inserted in the direction of the arrow A, the printed circuit board 6 for the contacts is moved further in the direction of the arrow B, increasing a contact pressure on the contacts 28a, 28b of the equipment. In the meantime, contacts 14a, 14b of the IC card 14 are slid with the surfaces thereof in an impinging relationship with the contacts 28a, 28b of the equipment.

Upon further insertion of the IC card 14 in the direction of the arrow A, the protuberances 36a, 36b of the guide arm 8 are slid along the surface of the guide plate 7, and as shown in FIGS. 5 and 6, the contacts 28a, 28b of the equipment attain a contact gap at Y2, stopping movement in the direction of the arrow B, and maintaining a contact pressure constant. During the interval, the switch press-down part 37 turns the switch 40 on, applying a voltage to the circuit of the IC card 14.

When the rear end of the guide arm 8 butts against the wall 22 as shown in FIG. 2, a travel distance of the guide arm reaches X2 as shown in FIGS. 5 and 6, and the insertion of the IC card 14 is stopped. Since the protuberances 36a, 36b of the guide arm 8 are pressing down against the surface of the guide plate 7, a frictional force in excess of the resilience of the return spring 9 acts between the IC card 14 and the card supporter 3, engaging the IC card 14 with the card supporter 3. Necessary processing is applied to the IC card 14 in this condition.

When the IC card 14 is withdrawn upon completion of the necessary processing applied to the IC card 14, the guide arm 8 is slid by the resilience of the return spring 9 in the direction of the arrow D as shown in FIG. 1 in the reverse sequence of the steps described above, turning the switch 40 off, and move the contacts 28a, 28b of the equipment in the direction of the arrow C so as to be separated from the contacts 14a, 14b of the IC card 14 while the front end of the guide arm 8 butts against the arm stopper 4.

As shown in FIGS. 4 and 5, contact between the contacts 28a, 28b of the equipment and the contacts 14a, 14b of the IC card 14 takes place within the range of a length L of the contacts 14a and 14b, respectively, of the IC card 14. Hence, there is no chance of the contacts 28a, 28b of the equipment coming into contact with the resin material composing the IC card 14.

The relationship between a position of the guide arm 8 in the initial connection position and ON/OFF of the switch 40 is described hereinafter. As shown in FIG. 6, the initial connection position is set such that a travel distance Xs of the guide arm 8 during an interval from turn-off of the switch 40 to a time required for the applied voltage to be turned off, and a contact margin distance Xm until a no-contact condition occurs between the contacts are fully covered. That is, a contact condition exists between the contacts even when the voltage applied to the circuit of the IC card 14 is turned off, eliminating a risk of a developed high voltage destroying the circuit of the IC card 14.

With the IC card connection unit according to the first embodiment of the invention, a pressing force acting in the direction of the IC card insertion path is converted into a force acting in the direction crossing the direction of the IC card insertion path at right angles by the agency of the sliding kinetic pairs set up between the guide plate and the guide arm, thereby enabling the printed circuit board having the contacts of the equipment to be smoothly slid against the guide posts so that the reliability of the mechanism is enhanced.

Furthermore, the switch for applying a voltage to the circuit of the IC card 14 is provided on the side of the equipment while the switch press-down part for turning the switch on or off is provided on a slidable portion so that after the contacts of the equipment come in contact with the contacts of the IC card, the switch is turned on, applying the voltage while before the contacts of the equipment are separated from the contacts of the IC card, the switch is turned off, terminating the application of the voltage, thereby eliminating the risk of a high voltage being developed upon separation of the contacts of the equipment from the contacts of the IC card, destroying the circuit of the IC card.

Second Embodiment

FIG. 7 is a sectional view of the main part of an IC card connection unit according to a second embodiment of the invention, cut in the middle thereof along the direction of an IC card insertion. FIG. 8 is a sectional view of the same when the IC card is inserted. The second embodiment differs from the first embodiment in that the IC card connection unit according to the second embodiment comprises, in place of the guide plate 7 and the guide arm 8, a push arm 50 is provided. Push arm 50 has one end 51 serving as a butted part installed in the card insertion path 15 so as to butt against the tip of the IC card. The other end 52 of push arm 50 is installed so as to butt against the reinforcing plate 27 of the printed circuit board 6 for the contacts such that the other end 52 causes the reinforcing plate 27 to be slid along the guide posts 17a, 17b, accompanying rotatably reciprocating movement of the one end 51 butted against the tip of the IC card 14 inserted into the card insertion path 15.

The push arm 50 is axially held by a spindle 54 journaled by stanchions 53a, 53b (53b not shown) installed upright on opposite sides of the guide arm hole 16b so as to be rotatably reciprocated. Further, the spindle 54 is provided with a torsion spring 55 with one end thereof butted against one end 51 of the push arm 50 and with the other end butted against the wall 22 so as to urge the push arm 50 in the direction of the arrow D. The other end 52 of the push arm 50 is provided with a switch press-down part 56 for turning on or off the switch 40 provided on the printed circuit board 10 for switching for applying a voltage to the circuit of the IC card.

With the push arm 50 is rotated in the direction of the arrow D by the urging of the torsion spring 55, a switch lever of the switch 40 is pressed down, terminating application of a voltage to the circuit of the IC card 14. When with the push arm 50 being rotated in the direction of the arrow E by the IC card 14, the switch lever is turned free, supplying a voltage to the circuit of the IC card.

When the IC card 14 is inserted into the card insertion path 15 until the tip thereof butts against a butting part of the card insertion path 15, the other end 52 of the push arm 50 presses down the surface of the reinforcing plate 27 of the printed circuit board 6 for the contacts such that a frictional force in excess of the urging of the torsion spring 55 acts between the IC card 14 and the card supporter 3. Thus, the IC card 14 is retained by the card supporter 3.

The operation of the IC card connection unit according to the second embodiment is similar to the case of the first embodiment, and therefore, explanation is omitted.

With the IC card connection unit according to the second embodiment, wherein the push arm is provided, the number of parts required is less than the case of the first embodiment, enhancing reliability of the mechanism.

Also, the switch for applying a voltage to the circuit of the IC card 14 is provided on the side of the equipment while the switch press-down part for turning the switch on or off is provided on the other end of the push arm. As such, after the contacts of the equipment come in contact with the contacts of the IC card, the switch is turned on, applying the voltage. Before the contacts of the equipment are separated from the contacts of the IC card, the switch is turned off, terminating the application of the voltage, thereby eliminating the risk of a high voltage being developed upon separation of the contacts of the equipment from the contacts of the IC card, and destroying the circuit of the IC card.

Further, in the first and second embodiments of the invention, the frictional force caused by a press-down force of the contacts of the equipment is used to cause the IC card to be retained by the card supporter; however, flat springs for pressing down the edges of the IC card may be installed on the edges of the card supporter as a supplementary device.

INDUSTRIAL UTILIZATION

The IC card connection unit according to the invention is quite useful in electronic equipment employing IC cards, for example, ATMs installed at financial institutions, portable electronic devices used for electronic transactions over the Internet, individual identification units used for identification of individuals, and like.

I claim:

1. An IC card connection unit for connecting contacts of an electronic equipment device to contacts of an IC card inserted into a card insertion path, comprising:

a body having contacting means for bringing contacts of an electronic equipment device and an IC card together, said contacting means including a movable, card butting part, wherein a pressing force applied by a tip of the IC card to the card butting part moves the card butting part from a first location to a second location, along a path of insertion of the IC card, thereby converting the pressing force into a force acting in a direction crossing a direction of the path of insertion of the IC card which causes the contacts of the electronic equipment device to be shifted from a first position in which the contacts of the electronic equipment device are disposed substantially out of the path of insertion of the IC card, to a second position in which the contacts of the electronic equipment device are disposed to come in contact with the contacts of the IC card, wherein when the card butting part is in the first location, the contacts of the electronic equipment device are in the first position, and when the card butting part is moved into the second location, the movement of the card butting part causes the contacts of the electronic equipment device to be simultaneously shifted into the second position; and a card supporter fixedly attached to the body and forming sidewalls of a card insertion path, said card supporter retaining the IC card when the IC card is pressed down by the contacts of the electronic equipment device.

2. An IC card connection unit according to claim 1, wherein the contacting means comprises:

guide posts installed so as to extend in a direction intersecting at a right angle to the direction of the path of insertion of the IC card;

a guide arm provided with an arm serving as the card butting part and being disposed in the card insertion path, and inclined surfaces serving as elements of sliding kinetic pairs, said guide arm being slidable parallel with the card insertion path;

a printed circuit board provided with the contacts of the electronic equipment device, and being installed so as to be freely slidable against the guide posts; and a guide plate held between the guide arm and the printed circuit board while being freely slidable against the guide posts, and being provided with inclined surfaces which form a sliding kinetic pair relationship with the inclined surfaces of the guide arm, whereby a pressing force applied to the arm of the guide arm is converted into the force acting in the direction crossing the direction of the path of insertion of the IC card.

3. An IC card connection unit according to claim 1, wherein the contacting means comprises:

guide posts installed so as to extend in a direction intersecting at a right angle to the direction of the path of insertion of the IC card;

a printed circuit board provided with the contacts of the electronic equipment device on one side, and being installed so as to be freely slidable against the guide posts; and a push arm axially supported at the center thereof so as to be rotatably reciprocated, and having one end thereof serving as the card butting part, and another end for being brought into contact with the printed circuit board.

4. An IC card connection unit according to claim 2, further comprising a switch for applying a voltage to a circuit of the IC card, said switch being provided on the body, and a switch press-down part for pressing down the switch provided on the guide arm.

5. An IC card connection unit according to claim 3, further comprising a switch for applying a voltage to a circuit of the IC card, said switch being provided on the body, and a switch press-down part for pressing down the switch provided on the push arm.

6. An IC connection unit, comprising:

a housing; and means for automatically bringing a contact disposed in said housing into engagement with a contact located on an IC card when the IC card is inserted into the housing and moved toward a predetermined position along a path of insertion, the contact in the housing being moved into the path of insertion of the IC card as the IC card is moved in said housing and toward the predetermined position so that when the IC card arrives at the predetermined position, the contact on the IC card will engage with the contact in said housing, said means further being for keeping the contact disposed in said housing separated from the IC card, whenever the IC card is out of the predetermined position.

\* \* \* \* \*